Aug. 31, 1965   A. F. FAIRBANKS   3,203,305
PASSIVE OPTICAL COLLISION WARNING SYSTEM
Filed Feb. 15, 1961   4 Sheets-Sheet 1

AVARD F. FAIRBANKS
INVENTOR.

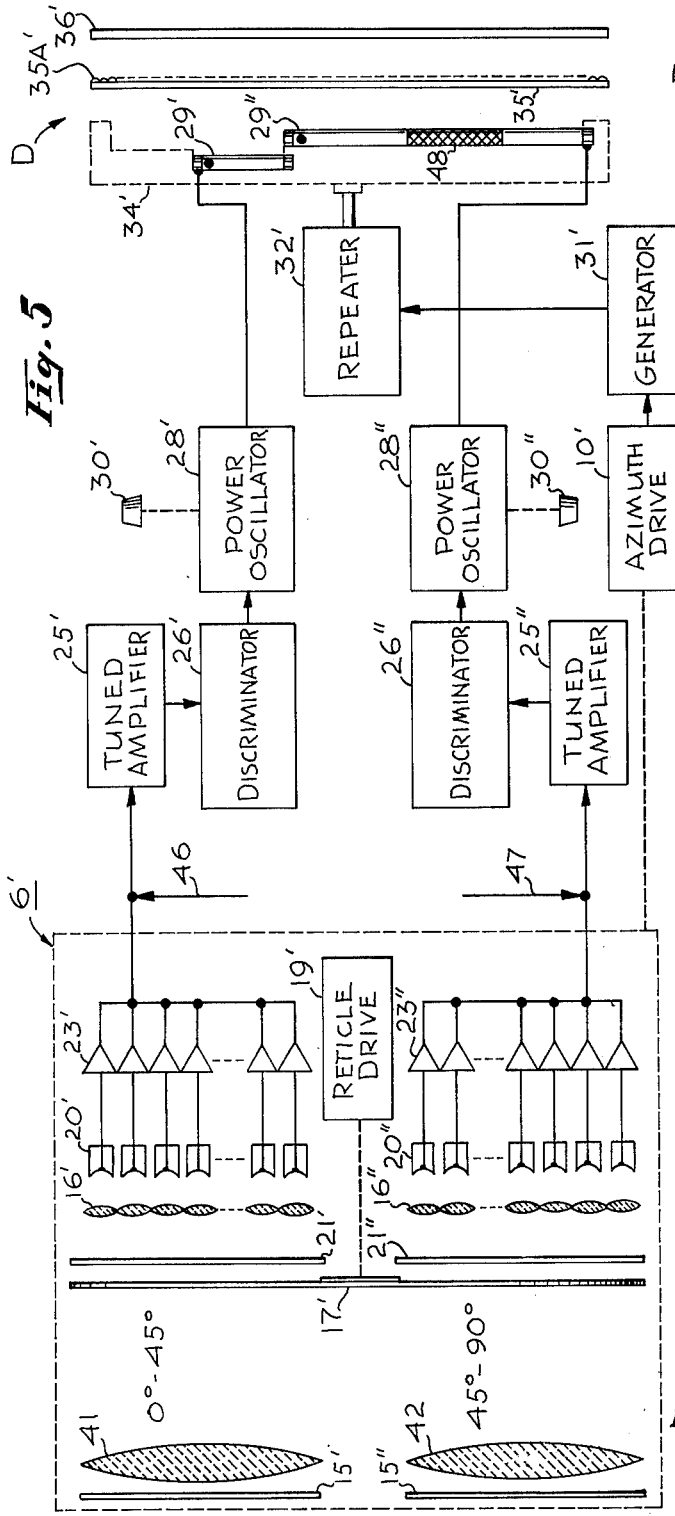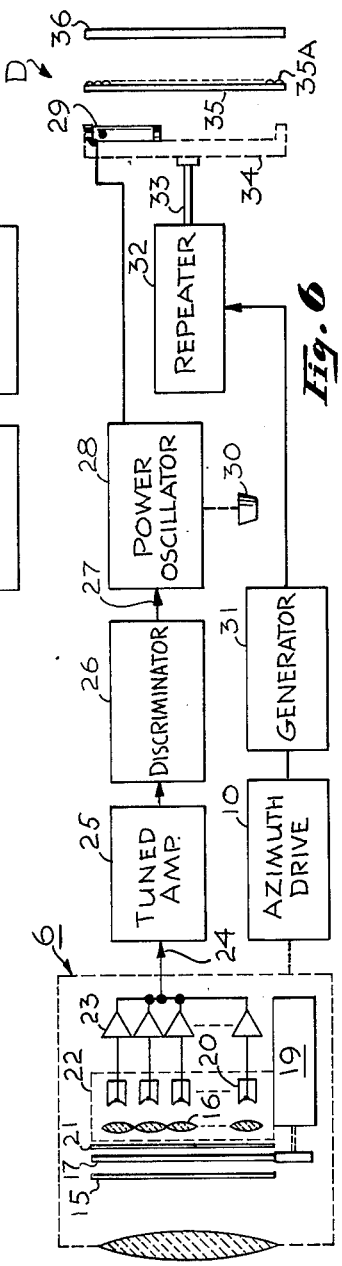
Fig. 5
Fig. 6
AVARD F. FAIRBANKS
INVENTOR.

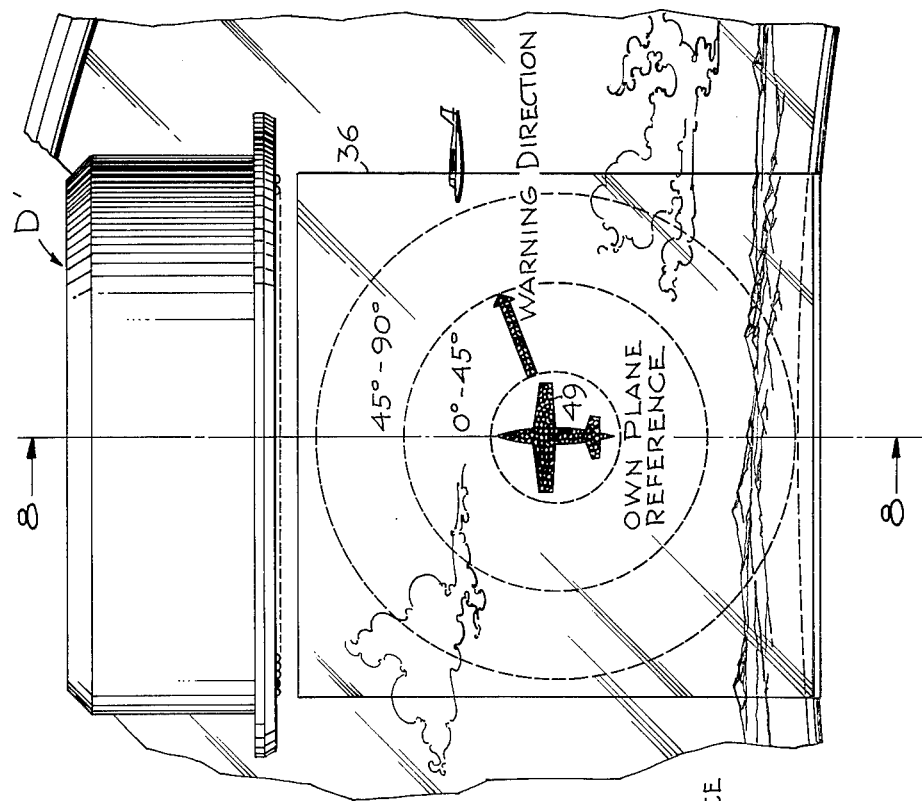
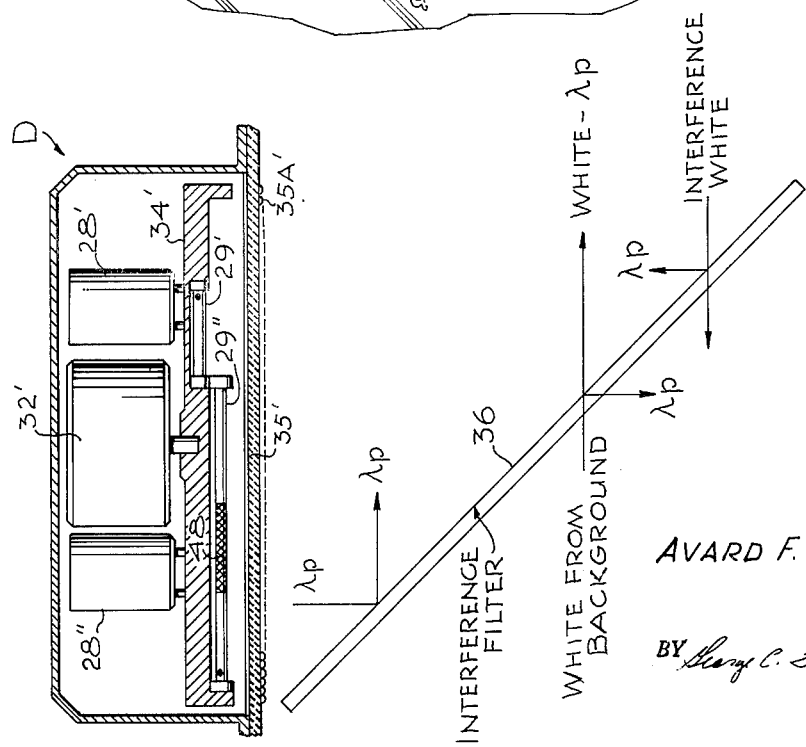

Aug. 31, 1965　　　A. F. FAIRBANKS　　　3,203,305
PASSIVE OPTICAL COLLISION WARNING SYSTEM
Filed Feb. 15, 1961　　　　　　　　　　　　4 Sheets-Sheet 4
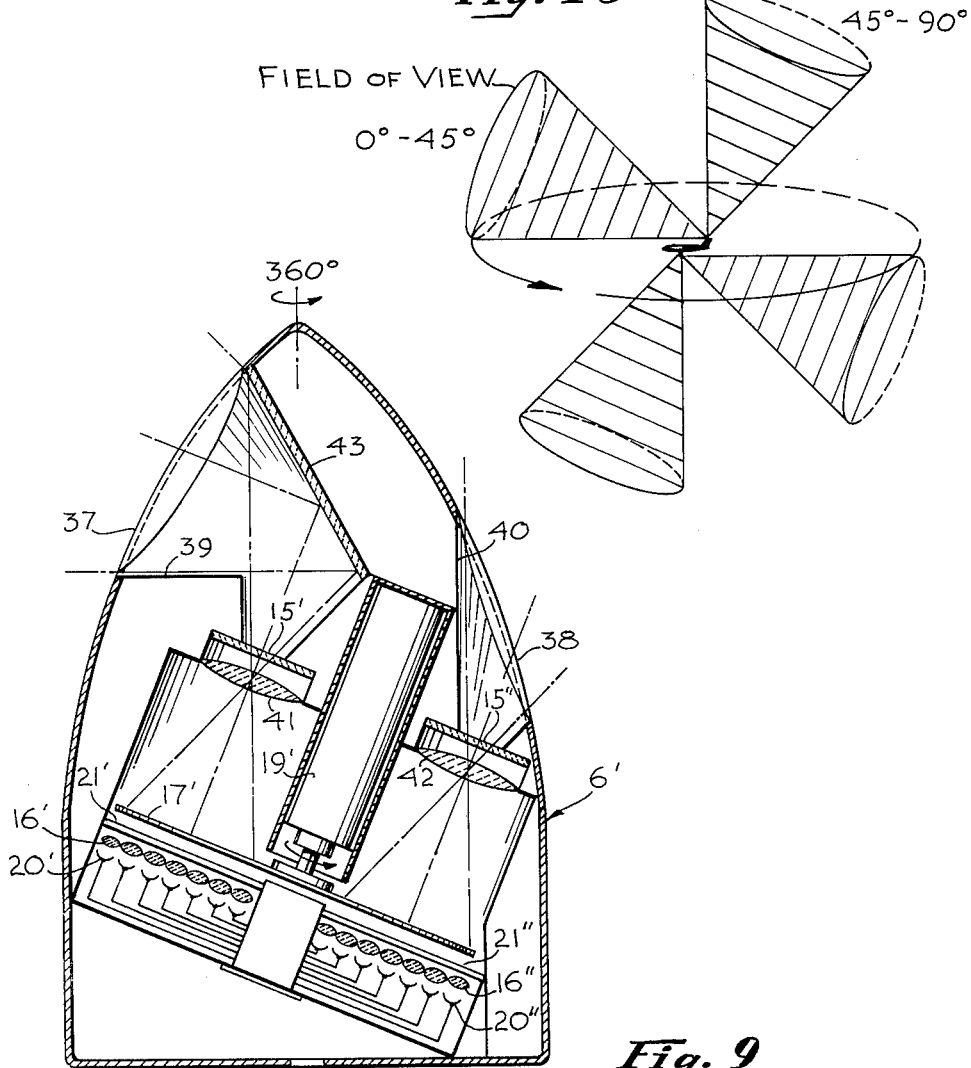
Fig. 10
Fig. 9
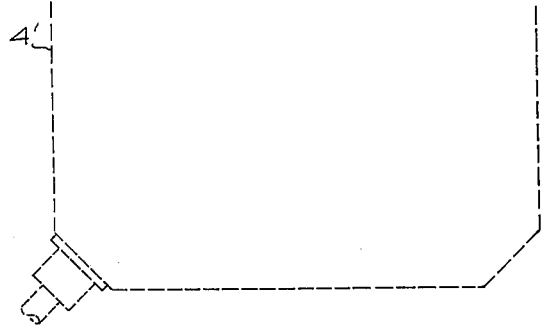
AVARD F. FAIRBANKS
INVENTOR.
BY George C. Thompson
agent

3,203,305
PASSIVE OPTICAL COLLISION WARNING SYSTEM
Avard F. Fairbanks, Canoga Park, Calif., assignor to Thompson Ramo Wooldridge Inc., Canoga Park, Calif., a corporation of Ohio
Filed Feb. 15, 1961, Ser. No. 89,453
5 Claims. (Cl. 88—1)

This invention relates to a passive optical collision warning system and more particularly to a continuously scanning object detecting system capable of providing an indication of the line of sight movement between relatively moving objects.

Aircraft mid-air collisions have occurred almost entirely during periods of relatively good visibility when the aircraft are operating under government regulated visual flight rules. It is, therefore, felt that most collision hazards could be eliminated through the use of a visual collision warning system which is operable during relatively good visibility conditions.

Most collision warning systems proposed to be used on aircraft involve the use of radio waves, resulting in equipment that is sufficiently large and expensive to be out of reach of the largest group of aircraft operated within the United States. This group comprises the many privately owned aircraft found in the United States today. As a result, most of the aircraft flying would be without collision warning equipment if systems using radio waves were adopted.

It is, therefore, an object of this invention to provide an optical collision warning system that is sufficiently light and inexpensive to fall within the means of private owner aircraft.

It is another object of this invention to provide a collision warning system of relatively simple structure that is capable of providing an indication of the direction and an indication of collision probability that can be expected to be encountered when two aircraft approach one another.

It is another object of this invention to provide an optical collision warning system capable of detecting aircraft even though the aircraft may be in the azimuth direction of the sun with respect to the collision warning system being used.

It is another object of this invention to provide an optical collision warning system that is capable of reducing optical background interference to a minimum by means of small fields of view and a space filtering reticle.

It is another object of this invention to provide an optical collision warning system capable of scanning all directions from the carrying system aircraft.

Another object of this invention is to provide an optical collision warning system that is operable at night as well as at day.

Another object of this invention is to provide an optical collision warning system that is responsive to selected lights carried by aircraft without being responsive to ground located lights.

Other objects, purposes, and characteristic features will become obvious as the description of the invention progresses.

In practicing this invention there is provided one or more scanning devices capable of utilizing the relative contrast between intruding vehicles and their background for initiating a display on a system vehicle capable of indicating the direction to any intruding vehicles, the direction indicator being capable of being repositioned as the relative vehicle paths change. The repositioning of the direction indicator is capable of providing the system vehicle operator with an indication of any possible miss distance to be expected as the two aircraft approach during day or night periods.

Referring to the drawings:

FIG. 5 is a schematic representation of a typical twin scanner system;

FIG. 6 is a diagrammatic representation of a single scanner system;

FIG. 7 is a diagrammatic view of the display portion of a typical plural type scanner system;

FIG. 8 is a view taken along the line 8—8 of FIG. 7 showing the details of the display system;

FIG. 9 is a sectional view of a typical maximum coverage scanner or receiver, usually used in pairs; and FIG. 10 is a typical diagrammatic representation of the coverage to be expected by a pair of scanners of the type shown in FIG. 9.

In each of the views similar parts bear like reference characters.

Figure 1A:
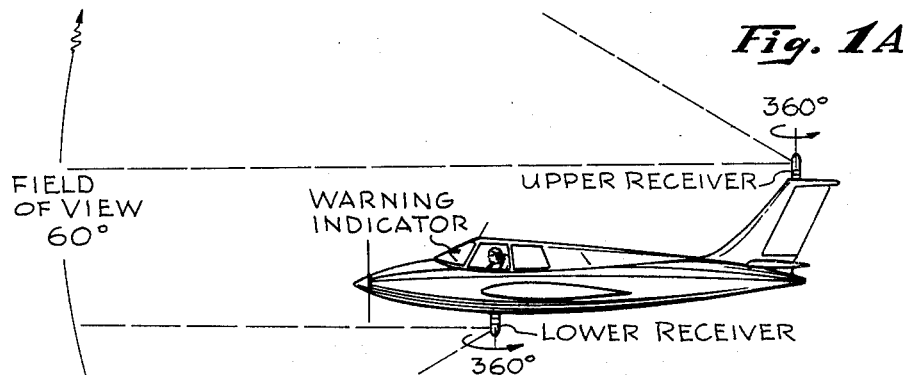
FIGURES 1A and 1B are diagrammatic showings of typical area coverage capable of being provided by dual or single scanners of the single lens type.
Figure 1B:
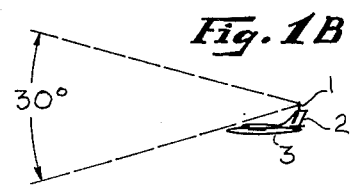
Figure 4:
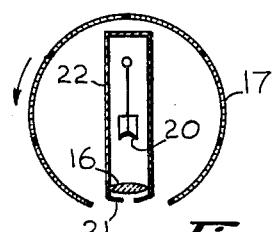
FIG. 4 is a view taken along the line 4—4 of FIG. 3 showing the arrangement of parts.
Figure 2:
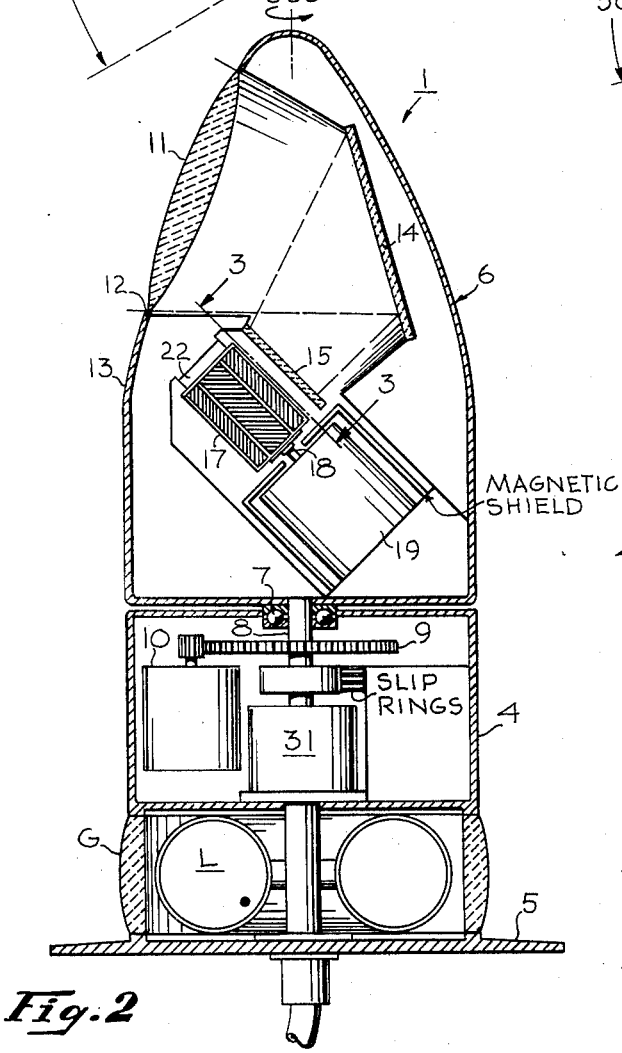
FIG. 2 is a view of a typical single lens scanner or receiver such as utilized in FIGS. 1A and 1B.

The system to be considered first is the relatively simple system which involves a typical scanning area such as shown in FIG. 1B and a scanning device or receiver such as shown in FIG. 2 and an overall system such as shown in FIG. 6.

As shown in FIG. 1B, the scanning device or receiver unit 1 may be suitably mounted at the top of a stabilizer 2 of a vehicle or aircraft 3. As shown in this figure, a desirable scan might involve an area 15° above and 15° below the center line of the receiver unit. The receiver unit 1 is provided with a base 4 capable of being securely mounted on the stabilizer 2 (or other part) of the vehicle 3 by some means such as a flange 5. The receiver unit 1 is provided with a head portion 6 capable of 360° rotation about a vertical axis. The head portion 6 is supported for 360° rotation on a suitable bearing 7 which is supported within the base 4. The head portion 6 is provided with a drive shaft 8 and a drive gear 9 operated by a rotating drive motor 10 for moving the head portion 6 around its 360° rotation path. The speed of rotation of the head portion 6 should be sufficiently slow to allow adequate intelligence of the scan for all areas to be covered. Positioned within the base 4 is a light L which may take the form of a sodium arc or fluorescent type which can be modulated by its source. The light L is provided with a lens G which is polarized, as explained hereinafter. The light L is provided for night use and polarized to reduce false indications by the associated receiver, as explained hereinafter.

Figure 3:
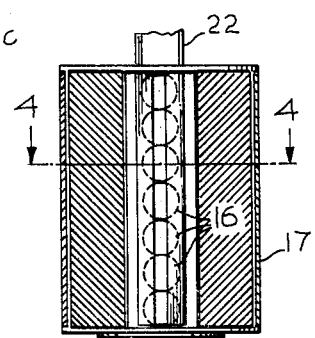
FIG. 3 is a view taken along the line 3—3 of FIG. 2 of the reticle and receiver unit removed from the scanner.

The head portion 6 is provided with a polarized lens 11 suitably positioned in an opening 12 in the head outer shell 13, with the polarization being 90° to any reflected light from the light L. The lens 11 is positioned to focus a certain desired area span, such as 30° of space of sky, on a suitable reflecting mirror 14 which is so positioned as to redirect the light through a light frequency limiting filter 15 and onto suitable pickup devices, such as the lenses 16 shown in FIG. 3. In order for the light to fall upon the lenses 16, it first must pass through a suitable reticle capable of providing background radiation suppression by allowing restricted coverage by each lens at any one moment. In order to provide complete coverage, it is necessary for the reticle to provide for movement of its slots from top to bottom or bottom to top along the lenses 16, as shown in FIG. 3. The reticle 17 may be of any well known type; however, it is shown as provided with a plurality of adjacent strips slotted to form bars, with the strips of substantially the same width as the lenses 16. The strips are placed to form a drum or cylinder, with the bars of adjacent strips being displaced 90° with respect to each of the neighboring strips. The reticle is further provided with one strip open for night use, as explained hereinafter. In order to provide the apparent movement of the bars for modulation, it is necessary to rotate the reticle cylinder. The reticle cylinder is, therefore, supported on a suitable shaft 18 which has one end secured to a suitable drive motor 19, which is in turn secured in a fixed postion within the head portion 6 of the receiver 1. The motor 19 rotates the reticle 17 at a suitable speed capable of providing, for example, approximately 400 cycle modulation of the light falling upon the lenses 16, and positions the open strip over the lenses 16 when the motor 19 is deenergized.

The reticle 17, being in the form of a cylinder, therefore provides a center open space therein for containing the plurality of lenses 16, and their associated photo-sensitive devices or photocells 20, and a suitable mask 21, all supported in position within the reticle by the support member 22. The mask 21 provides a narrow opening restricting the area of coverage to be handled by each of the lenses 16. This arrangement increases the sensitivity of the receiver.

With the light now passing through the reticle falling upon the lenses 16 and then being focused on the photo-sensitive devices or photocells 20, it can be seen that the photo-sensitive devices will respond to any change in background light due to object passage into the field of view. The plurality of lenses and photocells are used in place of a single large lens in order to prevent the sun from disabling the whole system during the portion of the receiver azimuth scan which includes the sun. It can be seen that only a single photocell will be affected at one time by the direct sunlight falling thereon and, being overloaded, will not provide a modulated signal. The others will operate normally.

The receiver 1 shown in FIG. 2 is an arrangement which is used in pairs in order for one to cover 30° above and the other to cover 30° below a horizontal line, such as shown in FIG. 1A. For a single unit receiver capable of covering an area above and below a horizontal line, it would be necessary to reposition the lens 11 and mirror 14 in order to provide the desired coverage above and below the horizontal line.

Looking now at FIG. 6, it can be seen that each of the photo-sensitive devices 20 is provided with a preamplifier 23, with the output of each preamplifier, in response to a target, connected to a common input 24 to a tuned amplifier 25 of any suitable type capable of selected bandpass characteristics at the reticle or night light source modulation frequency, discussed hereinafter. The tuned amplifier 25 provides an output to a suitable pulse length discriminator 26 capable of reducing the number of false indications that would normally be expected without such a discrimination. The pulse length discriminator then provides an output pulse signal through its output 27 to a suitable power oscillator 28 capable of providing sufficient energy to a gas discharge tube 29 in response to the output pulse. The power oscillator 28 is also provided with a manual input control 30 for adjusting the intensity of the gas discharge tube 29.

It should be clear that upon the reception of an object affecting the light detected by a photocell device 20, the input to its preamplifier 23 is changed, resulting in a pulse being supplied to the power oscillator 28 through the bandpass of the amplifier 25 and the pulse length discriminator 26. At this moment, therefore, the gas discharge tube 29 is caused to glow. In order to make this momentary glow of the tube 29 have intelligence, it is necessary to provide a means of positioning the tube with respect to the azimuth position of the head portion 6 of the receiver 1. In order to accomplish this, the receiver 1 is provided with a position generator 31 capable of providing an output in response to the position of the head portion 6. The position generator 31 provides a reference voltage to a drive generator repeater 32, which turns in synchronism with the generator 31. The generator repeater 32 is provided with an output shaft 33 for supporting an azimuth wheel or rotating carrier 34, which in turn supports the glow tube 29. Since the glow tube 29 response is basically a momentary flash and it is desirable to maintain the instantaneous flash position of the glow tube 29 for a time period slightly greater than necessary for one rotation of the head portion 6, a phosphor sheet 35 is provided overlying the glow tube 29. The phosphor sheet 35 is provided with collimating lenses 35A for greater intensity of the indications.

Since it would be hazardous to place a collision warning indicator in direct view of the pilot at all times since this position would be within his windshield, a phantom reflector plate 36 (represented in FIG. 6) is provided for reproducing the collision warning indication in phantom in the vehicle windshield area. The details of a typical indicator or display device D are shown in FIGS. 7 and 8 and will be explained hereinafter. It should be pointed out, however, that the display device D of FIGS. 7 and 8 is somewhat complicated by the fact that the device is made responsive to twin lens heads such as shown in FIG. 9 and thus responsive to a circuit such as shown in FIG. 5.

A brief explanation of the action provided by the display device D of FIG. 6 should be given to better understand the system operation. If we assume that the detector head has sensed an approaching aircraft and if we assume that the aircraft is on a course that will provide collision, the warning display by the phosphor sheet 35 and repeated on the phantom plate 36 will appear in one position and maintain that position with each repeated detection until an evasive maneuver is accomplished. If we now assume that a collision warning display appears and that the aircraft will actually miss at a relatively close distance, it can be seen that the line of sight between the two aircraft would appear to rotate. When this occurs, each revolution of the head 6 will cause the display to reappear in a new position. Each new position would also cause a rotation effect to be observed by the pilot. If the rotation effect is sufficiently fast, the pilot will know that no collision will occur.

Since the sensing head 6 scans a full 360° azimuth, it is obvious that each intruder aircraft that may be encountered in the 360° rotation will cause a display to occur along its relative bearing. This means that a plurality of possible colliding aircraft can be simultaneously processed by this collision warning system.

In order to provide a greater area coverage while maintaining a relatively constant sensitivity, a system using the scanning receiver shown in FIG. 9 can be arranged. The scanning receiver of FIG. 9 is similar to that shown in FIG. 2 with the exception that the head 6' is now provided with a pair of openings having polarizing lenses 37 and 38 covering mask passages 39 and 40, respectively, capable of reflecting or directly applying area coverage to suitable magnifying lenses 41 and 42, respectively. The passage 39 is provided with a reflective surface 43 for directing light of the area to be covered onto the magnifying lens 41. This light is passed through a suitable light frequency bandpass filter 15' before falling on the magnifying lens 41. It can be seen, therefore, that the lens 41 may be made to cover an area from horizontal to 45° above or below the aircraft, depending upon its receiver mounting position. The magnifying lens 42 is positioned with respect to the polarizing lens 38 so as to receive light from an area falling between the 45° and 90° elevation or depression with respect to the horizontal, depending upon where the receiver is mounted. The light passing through the polarizing lens 38 passes through a suitable light frequency bandpass filter 15″ before falling on the magnifying lens 42. With the introduction of greater coverage and two simultaneously scanned areas, it is found desirable to reshape the reticle into a circular disc-shaped reticle 17′ to provide simultaneous modulation of the light received from both lenses 41 and 42. The lenses 41 and 42 cover different bands of air space, and the coverage at any one moment is separated by 180° in azimuth due to the physical positioning of the lenses in the head 6′. With the physical 180° displacement of the lenses 41 and 42, it is necessary to provide two sets of lenses 16′ and 16″ and two sets of photosensitive devices or photocells 20′ and 20″ in two separate groups associated with the lenses 41 and 42, respectively. In addition, the mask must now be split into two masks 21′ and 21″ to mask all of the lenses 16′ and 16″, respectively, and the reticle 17′ must be provided with two open slots to be indexed over the lenses 16′ and 16″ when the motor 19′ is deenergized for night operation. In order to cover both hemispheres, two receivers must be used, with one placed on top of the vehicle and the other one placed beneath the vehicle, as shown in FIG. 10.

The circuit of FIG. 5 is a circuit necessary for a scanning head such as shown in FIG. 9. In this circuit the two lenses 41 and 42 pass their light and target responses through the reticle 17′ and the masks 21′ and 21″ to focus the light on the lenses 16′ and 16″, respectively, for activating the photocells 20′ and 20″, respectively, which in turn activate the inputs to the preamplifiers 23′ and 23″, respectively. The preamplifiers 23′ and 23″ supply output signals, in response to targets in the areas covered by the lenses 41 and 42, to separate signal summation tuned bandpass amplifiers 25′ and 25″ capable of amplifying the signal received by the lenses 41 and 42, respectively. As pointed out hereinbefore, the lens 41 covers a different area than the lens 42. With the lenses positioned to cover separate azimuth positions in space, it is necessary to process the signals separately, as will be explained hereinafter.

It should be pointed out at this time, however, that a second scanning head could also provide inputs to the summation tuned amplifiers 25′ and 25″ as long as the head (not shown) on the second scanner or receiver is synchronized with the head 6′ of the first scanner or receiver. The input for the 0° to 45° depression coming from the second head (not shown) would be received over the conductor 46 to be combined with the input from the lens 41. The input from the lens covering the 45° to 90° in the area of depression in the second head (not shown) would be combined with the input from the lens 42 to the summation tuned amplifier 25″ by providing the input over the conductor 47. Although the inputs from the second head (not shown in detail) are shown as combined with the inputs from the first head 6′, it should be clear that two additional single processing channels to those shown in FIG. 5 could be provided, with an additional display device being utilized. This arrangement would allow a greater sensitivity than the sensitivity realized in combining the signals to actuate a single display device.

The outputs from the summation tuned amplifiers 25′ and 25″ are then fed into pulse length discriminators 26′ and 26″, respectively, to activate suitable power pulse oscillators 28′ and 28″, respectively. The pulse oscillators 28′ and 28″ are similar to the pulse oscillator 28 of FIG. 6 and therefore provide output pulses to energize suitable gas discharge tubes 29′ and 29″ for the oscillators 28′ and 28″, respectively. Each of the gas discharge tubes 29′ and 29″ is extended to the center of the carrier 34 to light a center reference aircraft 49. The center aircraft is illuminated whether the pulse comes from the oscillator 28′ or oscillator 28″, or both. In addition, the tube 29′ is darkened in the area 48 to prevent a display in the tube 29′ display area.

The display device D′ operates similarly to the device D of FIG. 6 with the execption that the rotating carrier 34′ is provided now with two glow discharge tubes or lamps, one of which provides a display for one azimuth band (for example, 0° to 45° above and below) along with the reference aircraft and the other of which provides a display for the other azimuth band (for example, 45° to 90° above and below) and the reference aircraft 49.

The display or interference filter 36′ is positioned at approximately a 45° angle with respect to the phosphor sheet 35′ in order that the image of the phosphor sheet when energized will be reflected from the filter 36′ and appear as a phantom design in the area of the vehicle windshield. The interference filter 36′ is of the type previously known capable of filtering out the wavelength of the color of the phopshor from any light being received through the windshield. With this action the phosphor colors appear very definite even with sunlight in the background.

The glow of discharge lamps 29′ and 29″ in FIG. 8 is shown as activated by the proper oscillators 28′ and 28″, respectively. The intensity of the glow lamps can be manually adjusted through suitable control circuits 30′ and 30″ for the power oscillators 28′ and 28″, respectively. As previously pointed out, the glow of the phosphor sheet is maintained for a time period of at least one full revolution of the receiver head. In addition, the phosphor sheet 35′ is provided with collimating lenses 35A′ for concentrating the light from the phosphor toward the pilot and for reducing the interference of reflection from stray light in the aircraft.

For night time use, special transmission lamps are required on each aircraft, such as the sodium vapor arc or fluorescent lights L (see FIG. 2) which modulate at the frequency for which the bandpass amplifiers are tuned. These lamps L must be continuously modulated and omnidirectional, since the receivers sweep around, and there would be a chance of missing a target if the lamps either blinked or swept also. In order for the lamp L on the local aircraft to not cause interfering back scatter to its own receiver preventing the receiver or receivers from detecting another aircraft at a distance, the lamp is covered with the previously mentioned "Polaroid" filter lens G in a cylindrical sheet, with the axis of polarization 45° to the vertical. The receiver is also provided with the polarized filter lens (as previously described), and this lens is oriented 90° with respect to the lamp L. The receiver is best located either directly above or below the lamp. Although the receiver cannot see the back scatter from the lamp in any direction, any other aircraft provides light polarized in the proper direction to pass through without being affected. Also, for night use the lamp provides the modulation, and the reticle is stopped with its open slot positioned over the cells. Each cell is now provided with a clear view of any target-modulated light. It is further pointed out that the filters 15, 15′ and 15″ are selected to pass the frequency band within which the frequency of the lamp L is located.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. Optical collision warning systems for a plurality of vehicles, each of said vehicles comprising: visible frequency sensitive receiver means; vehicle bearing detection means in said receiver means for vehicle detection over a substantial azimuthal coverage to provide an output in response to a change in intensity of the received visible frequency in response to another vehicle; indicator means responsive to said receiver output to provide a continually checking indication of the receiver detected relative bearing of said change in intensity of the received visible frequency; tuned amplifier means connected between said receiver means and said indicator means for system response to only a selected frequency; each of said vehicles including, in addition to said receiver means, visible frequency transmitter means for transmitting a visible frequency signal, and means for modulating said visible frequency signal with a frequency capable of passing through said tuned amplifier means on other vehicles for night response, said visible frequency transmitter means being positioned to prevent direct visible frequency transmission into the visible frequency sensitive receiver means of its vehicle.

2. Optical collision warning systems for a plurality of vehicles, each of said vehicles comprising: visible frequency sensitive receiver means; vehicle bearing detection means in said receiver means for vehicle detection over a substantial azimuthal coverage to provide an output in response to a change in intensity of the received visible frequency in response to another vehicle; indicator means responsive to said receiver output to provide a continually checking indication of the receiver detected relative bearing of said change in intensity of the received visible frequency; tuned amplifier means connected between said receiver means and said indicator means for system response to only a selected frequency; each of said vehicles including, in addition to said receiver means, visible frequency transmitter means for transmitting a visible frequency signal, means for modulating said visible frequency signal with a frequency capable of passing through said tuned amplifier means on other vehicles for night response, said visible frequency transmitter means being positioned to prevent direct visible frequency transmission into the visible frequency sensitive receiver means of its vehicle; first polarizing lens means for said visible frequency sensitive receiver means; and second polarizing lens means for said visible frequency transmitter means; said first and second polarizing lens means being oppositely polarized to prevent reflected frequencies of said visible frequency transmitter means from being received by said visible frequency sensitive receiver means.

3. An optical collision warning system for a vehicle comprising:
a lens movable through a predetermined field of view,
a plurality of photocells each positioned to optically receive visible frequency energy through said lens and to generate a signal in response to changes in intensity of the received visible frequency,
a frequency limiting filter in the path between said photocells and said lens,
a space filtering reticle also in said path for modulating the reception of visible frequency energy by said photocells,
each of said photocells having a focusing lens whereby said cells receive visible frequency energy in different positions of azimuth,
a tuned frequency amplifier and pulse length discriminator connected to said photocells whereby intensity change pulses to said amplifier and discriminator not of a preselected frequency and pulse duration are not passed,
an object position indicator responsive to pulses passing from said amplifier and discriminator,
said position indicator having an azimuth wheel with a discharge glow tube thereon movable in synchronization with said movable lens, said tube being energized in response to said intensity change indicating pulses to thereby indicate the direction of the object causing the intensity change,
a phosphor glow sheet positioned to receive light from said tube to retain the object direction indicating glow therefrom while the azimuth wheel and discharge tube continues to move.

a phantom reflector plate angularly displaced from said phosphor sheet to project the image thereon into the field of view of the occupant of the vehicle, said plate serving to filter out the wavelength of the color of the phosphor from energy from other sources passing therethrough,
whereby continued glow from the warning display from the same angular direction indicates a collision course between the vehicle and the object and a rotational movement of warning display will indicate a non-collision course.

4. An optical collision warning system for a vehicle comprising:
a lens movable through a predetermined field of view,
a plurality of photocells each positioned to optically receive visible frequency energy through said lens and to generate a signal in response to changes in intensity of the received visible frequency,
a space filtering reticle in the path between said photocells and said lens for modulating the reception of light frequency energy by said photocells,
each of said photocells having a focusing lens whereby said cells receive light frequency energy in different positions of azimuth,
means for generating pulses in response to changes in intensity of the visible frequency energy received by said photocells,
an object position indicator responsive to said pulses,
said position indicator having a warning display movable in synchronization with said movable lens, said display being energized in response to said pulses to thereby indicate the direction of the object causing the intensity change,
means positioned to receive light from said display to retain the object direction while said display continues to move,
whereby continued energization of said warning display while in the same angular direction indicates a collision course between the vehicle and said object and energization of said warning display while in another angular direction will indicate a non-collision course.

5. An optical collision warning system for a vehicle comprising:
a lens movable through a predetermined field of view,
a plurality of photocells each positioned to optically receive visible frequency energy through said lens and to generate a signal in response to changes in the received visible frequency,
a space filtering reticle in the path between said photocells and said lens for modulating the reception of light frequency energy by said photocells,
each of said photocells having a focusing lens whereby said cells receive light frequency energy in different positions of azimuth,
discriminator means for generating pulses in response to changes in intensity of the visible frequency energy received by said photocells,
an object position indicator responsive to said pulses,
said position indicator having a warning display movable in synchronization with said movable lens, said display being energized in response to said pulses to thereby indicate the direction of the object causing the intensity change,
means positioned to receive light from said display to retain the object direction while said display continues to move,
a phantom reflector plate displaced from said last mentioned means to project the image thereon into the field of view of the occupant of the vehicle,
whereby continued energization from said warning display while in the same angular direction indicates a collision course between the vehicle and said object and energization of said warning display while in another angular direction will indicate a non-collision course.

References Cited by the Examiner

UNITED STATES PATENTS

| | | | |
|---|---|---|---|
| 1,963,826 | 6/34 | Chilton | 88—1 |
| 2,379,496 | 7/45 | Saunier | 88—1 |
| 2,470,912 | 5/49 | Best et al. | 88—1 X |
| 2,858,453 | 10/58 | Harris. | |
| 2,882,416 | 4/59 | Fairbanks et al. | |
| 2,909,958 | 10/59 | Hildebrand | 88—1 |
| 2,949,536 | 8/60 | Langton | 88—1 |
| 3,004,162 | 10/61 | Menke. | |
| 3,038,996 | 6/62 | Grube | 250—203 X |

JEWELL H. PEDERSEN, *Primary Examiner.*

EMIL G. ANDERSON, *Examiner.*